US005084705A

United States Patent [19]

Frye et al.

[11] Patent Number: 5,084,705

[45] Date of Patent: Jan. 28, 1992

[54] FACADE CONSTRUCTION IN HIGH RISE STRUCTURES

[75] Inventors: Andreas Frye, Vechta; Jürgen Kruse, Genderkesee; Julius Weyand, Bremen Borgfeld; Joachim Bettermann, Delmenhorst; Dirk Bringmann, Bremen, all of Fed. Rep. of Germany

[73] Assignee: Messerschmitt Bölkow-Blohm GmbH, Ottobrunn, Fed. Rep. of Germany

[21] Appl. No.: 465,938

[22] Filed: Jan. 16, 1990

[30] Foreign Application Priority Data

Jan. 13, 1989 [DE] Fed. Rep. of Germany ....... 3900856

[51] Int. Cl.[5] ................ G01S 7/36

[52] U.S. Cl. ................ 342/1; 52/235

[58] Field of Search ................ 342/1, 4; 52/235

[56] References Cited

U.S. PATENT DOCUMENTS 4,006,479 2/1977 LaCombe .
4,023,174 5/1977 Wright .
4,118,704 10/1978 Ishino et al. .
4,162,496 7/1979 Downen et al. .
4,327,364 4/1982 Moore .
4,701,761 10/1987 Affinito .

FOREIGN PATENT DOCUMENTS 1842857 3/1961 Fed. Rep. of Germany .
3307066 9/1984 Fed. Rep. of Germany .
893007 4/1962 United Kingdom .
2058469 4/1981 United Kingdom .

OTHER PUBLICATIONS

Hochfrequenz-absorbierende Materialien, Dominik, H. et al., ntz Bd. 41, (1988), Heft 5, pp. 280–283.

*Primary Examiner*—Mark Hellner
*Attorney, Agent, or Firm*—Toren, McGeady & Associates

[57] ABSTRACT

Flat panel elements are placed ahead of structural parts reflecting electromagnetic waves, in the region of radar waves, in order to provide an absorption or reduction of the reflection. For this purpose electrically and/or magnetically conducting materials are embedded into an insulating material in order to form areas of conductivity. The dimensions of these areas of conductivity in all planes are at least 1000 times smaller than the wavelength of the waves to be absorbed, and the electrically and/or magnetically conducting materials amount up to 40% of the weight of the panel area elements.

7 Claims, 1 Drawing Sheet

FACADE CONSTRUCTION IN HIGH RISE STRUCTURES

BACKGROUND OF THE INVENTION

The invention is directed to a facade construction of high rise structures, such as buildings, especially in thin wall or thin layer construction, wherein the outer areas are formed by flat panel members.

Such designs are known and serve as facade linings as aesthetic elements in addition to providing weatherproofing. It has, however, been seen that problems arise if such structures are located in direct proximity to radio guidance beacons and airport surveillance radar, because of the large geometric dimensions of the structures and the thereby arising large area flat contours, especially if electrically conducting or magnetic materials are used. In these cases such structures cause reflections, which for instance produce erroneous receptions together with aircraft transponders at ranges up to 100 km.

SUMMARY OF THE INVENTION

Accordingly, it is as object of the present invention to create a facade buildup of the generic type, which enables damping of the reflections in a simple manner or absorption of the arising electromagnetic waves so as to avoid impairment of directional radio beacons and airport surveillance radar installations.

Pursuant to this object, and others which will become apparent hereafter, one aspect of the invention resides in arranging coatings of material absorbing electromagnetic waves in the external region of the facade ahead of structural parts reflecting electromagnetic waves. The absorbing material is electrically non-conductive, with electrically conducting and/or magnetic materials being embedded therein for forming regions of conductivity, whose dimensions in all planes are at least 1000 times smaller than the wavelength of the electromagnetic waves to be absorbed. The electrically conducting and/or magnetic materials amount up to 40% of the weight of the coating.

In such a design the impinging waves are essentially absorbed or dampened by the conducting regions thus formed, by converting the wave energy into heat.

An advantageous embodiment is created by forming the panel elements from a plastic material such as an electrically non-conductive material and embedding therein soot particles of an electrically conductive material.

It is proposed furthermore that iron carbonyl powder can be utilized as a magnetic material.

In order to further improve the inventive design, the surfaces reflecting the electromagnetic waves are structured so that a subtraction can be accomplished due to the different travel times of the reflected electromagnetic wave shares.

In a further embodiment, the surfaces reflecting the electromagnetic waves have a structure with depth, such as a grooved surface.

Furthermore, the coating is formed of several layers, and the electrically conducting and/or magnetic material comprises different shares by weight. As a further improvement, a metallic screen, such as an antenna, for reflection is arranged ahead of the coating, and a subtraction is due to different travel times of the reflected electromagnetic wave shares.

It is possible to eliminate the prior art problems of interfering reflection from high rise structures with the present invention. The surface panel elements with coatings are usually fastened according to the proposed buildup at the structural member, and protective layers consisting of electric insulators can be additionally applied ahead of these panel elements, in order to form a facade external side consisting of a different material. The electrically conducting and/or magnetic materials embedded into the area panel elements are applied into the insulating material by way of waste products. This can possibly occur in the course of the fabrication process. Herein the dimensioning of the conducting regions is accomplished in accordance with the wavelength of the waves to be absorbed.

The coating can be applied by either flame gun spraying or plasma gun spraying. Alternately, naturally the structuring of several partial layers can occur by roll bonded cladding.

DETAILED DESCRIPTION OF THE PREFERRED EMBODIMENTS

Figure 1:
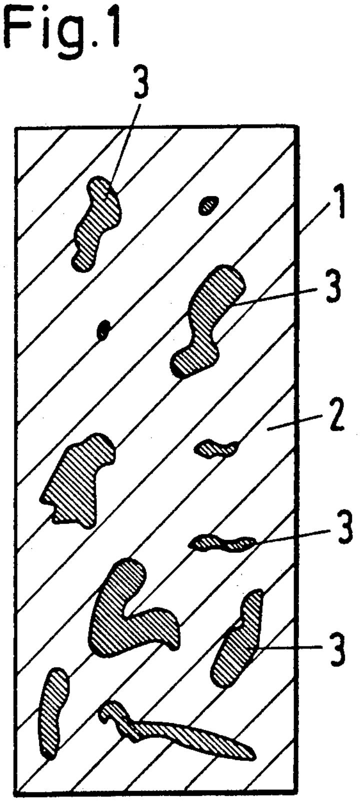
FIG. 1 is a cross-section through an area element for lining walls, pursuant to the present invention.

FIG. 1 shows a cross-section of an area element 1 for lining the walls of a building 4. The area element 1 is made up of regions of conductivity 3 embedded into an electrical dielectric 2. The electrically conductive regions 3 are made of electrically conducting and/or magnetic material which can be introduced, for example, in a finely divided state into an electrical dielectric 2 made of a plastic material.

Figure 2:
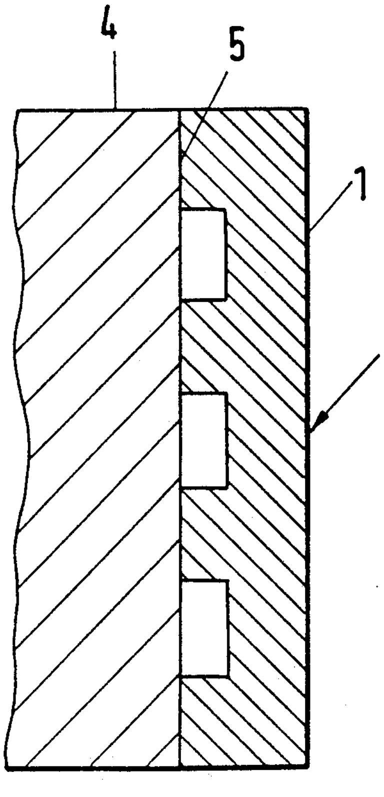
FIG. 2 is a cross-section through a building wall lined with the element of FIG. 1.

A building 4 lined with the area element 1 is shown in FIG. 2. A reflection surface 5 which reflects electromagnetic waves is provided in the region of the side of the element 1 which faces the building 4. The reflection surface 5 has a structured design which causes the area element 1 to have different thickness in the propagation direction of an incoming electromagnetic wave. This results in a different travel time for the reflected wave shares.

While the invention has been illustrated and described as embodied in a facade construction in high rise structures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A facade buildup in high rise structures, in thin layer structuring, comprising:

flat panel elements forming outer regions of the buildup; and a coating formed of a material which absorbs electromagnetic waves fastened in the outer regions ahead of structural parts reflecting electromagnetic waves, the coating being made of an insulator, into which at least one of electrically conducting and magnetic materials are embedded so as to form regions of conductivity, these regions having dimensions in all planes at least 1,000 times smaller than the wavelength of magnetic waves to be absorbed, and the electrically conducting and magnetic materials constituting up to 40% of the coating, the surfaces reflecting the electromagnetic waves being structured so that a subtraction of oscillation shares is achievable due to different travel times of reflected electromagnetic wave shares.

2. A facade buildup according to claim 1, wherein the flat panel elements are formed of a plastic material as an insulator with soot particles embedded therein as an electrically conducting material.

3. Facade buildup according to claim 1, wherein the magnetic material is iron carbonyl powder.

4. A facade buildup according to claim 1, wherein surfaces reflecting the electromagnetic waves have a structure with depth.

5. A facade buildup according to claim 4, wherein the surfaces are grooved.

6. A facade buildup according to claim 1, wherein the coating is formed of several layers and the at least one of electrically conducting and magnetic materials comprise differing shares by weight.

7. A facade buildup according to claim 1, and further comprising a metallic screen as an antenna for reflection is placed ahead of the coating and a subtraction of oscillation shares is accomplishable due to differing travel times of the reflected wave shares.

* * * * *